Patented May 1, 1923.

1,453,586

UNITED STATES PATENT OFFICE.

EUGENE M. HEARNE, OF BROOKLYN, NEW YORK.

SOLDERING FLUX.

No Drawing. Application filed January 18, 1921. Serial No. 438,259.

*To all whom it may concern:*

Be it known that I, EUGENE M. HEARNE, a citizen of the United States, residing in the city of Brooklyn, county of Kings, State of New York, have invented certain new and useful Improvements in Soldering Flux, of which the following is a specification.

This invention relates to the provision of a flux for use in connection with soldering, for the purpose of causing free flow of the soldering metal, particularly under conditions when the materials and methods heretofore in use have proved impracticable or involved difficulties. It involves in some cases the addition of certain materials by admixture or mechanical combining with rosin or rosin and oil, which latter have heretofore alone been used, but which in certain cases will not alone serve the desired purpose.

As an example, vessels containing gas, such as gas meters, consist of sheet metal pieces the joints of which are soldered to make them air and gas-tight. The continuous flow of gas through such chambers or boxes affords an opportunity for the settling of impurities from the gas on the walls and on the seams or soldered joints, with in some cases a possible separation of gases which may settle on the surface of or attack the solder. The necessary periodic repairs of such boxes require the opening of the seams, and it is found that the coating of the solder provides a very stubborn obstacle to the melting of the solder and opening of the seams. The contents and character of the deposited gas impurities may vary considerably, but with the increased use of gas made from oils it appears that the difficulties have been greatly increased in this respect and it has become a matter of general knowledge in this trade that the difficulties involved due to these particular causes are not alone a matter of great expense, but have been a puzzling and unaccountable difficulty of far-reaching effect.

The sulphur, gas or hydro-carbon deposited on the solder under the conditions mentioned, I have discovered yield completely to the action of a flux which involves the addition of about an equal part of charcoal which I prefer to finely pulverize and mix with the resin, and which mixture is added to an approximately equal amount of oil, preferably sperm oil. In addition, a finely powdered oxide of iron is added in quantity about one-third or one-half that of the charcoal, in weight. With a flux made as just described, the soldered joint of sheet metal pieces, no matter how badly covered or effected by the deposits from gas, will yield to the action of the soldering iron when applied for the purpose of causing the solder to flow and open the joint. Without the admixture in the flux of the charcoal it has proven almost impossible to separate the joint, but the ordinary soldering iron heat will not cause flow of the solder, and when the heat of the soldering iron is greatly increased additional difficulties develop, and in either case the solder rolls off in balls and separates in spots but does not clear the joint in the way required, as generally termed a free-flow. The addition of iron oxide greatly improves the action of the flux, while the exact relative amount of iron oxide and, in fact, the precise proportions thereof and charcoal and rosin may be considerably varied.

The rosin may be broken up and mixed with the powdered or pulverized charcoal forming a fairly uniform mixture upon the heating of the rosin particularly when oil is added. Likewise the finely divided iron oxide distributes itself readily through the mixture when this additional ingredient is desired in any proportions within the desired limits. This new flux may be mixed in the desired proportions of ingredients with oil forming a viscous fluid which can be packed in cans and supplied for use in the ordinary way as an article complete ready for application. It is also practical to provide a mixture of charcoal with a smaller amount by weight of oxide of iron, but without rosin or oil, and transport the same in cans so that it may be locally added to the rosin or rosin and oil.

In either case the dry mixture, or the complete flux as a fluid may respectively be preserved and transported for use, without change of character and without being effected by temperature or other climatic variations. This offers a commodity readily handled under all commercial conditions, besides the particular advantages heretofore set forth in the use of the flux.

The solvent or neutralizing effect of the flux under the heat of the soldering iron is such as to prevent any objectionable action of the deposit coating upon the tin or lead of the solder.

When it is then desired to solder the seams of sheet metal which have been coated by gummy deposit, the great difficulty in attempting to remove the deposit requires no consideration, but the use of this improved flux clears the joints and permits the resoldering with the same ease as if new sheet metal had been involved with perfectly clear joints and adjacent areas.

While in some cases muriatic or other acids might be used for cleaning of joints, such requires relatively greater cost and time, but on account of the chance of the effect of the acids upon the metal, if not completely cleaned off after the soldering, the use of acids is not alone objectionable but in many cases prohibitive.

With the improved flux herein described, there is no objectionable effect by the spreading of the material accidentally remaining upon the adjacent surface, which in addition to the ease of desoldering and soldering of joints makes this flux of great importance in overcoming the difficulties heretofore encountered in this class of work.

Irrespective of the precise chemical action brought about by the deposit on joints of tarry residues or sulphur gas, in conjunction with the lead or tin in the solder, when subjected to the soldering heat, the approximate proportions of soldering mixture heretofore specifically set forth, I have discovered yield uniformly most advantageous results and eliminate all difficulties involved in the particular work above mentioned. The extent of solvent effect or chemical reaction at the temperatures involved depends upon the character of the deposit in any particular case which coats or attacks the solder, in the case of deposits from illuminating gas of various products and quality, the flux mixtures herein prescribed have entirely overcome the difficulties heretofore experienced.

There may be many other cases of the presence of impurities which might mechanically or chemically affect soldering or desoldering other than the particular cases above described, and various modifications may be made with respect to the exact proportions of the mixtures and the fineness of pulverization of charcoal or of the charcoal and oxide of iron may be varied for particular purposes.

What I claim and desire to secure by Letters Patent is.

1. A flux for use in connection with solder, comprising an admixture of charcoal and oxide of iron with rosin.

2. A soldering flux comprising finely ground charcoal, pulverized oxide of iron of a lesser amount by weight, and an amount of rosin substantially as great as the charcoal.

3. A soldering flux comprising substantially one part of charcoal and one part of rosin with a third to a half part of oxide of iron.

4. A soldering flux comprising a fluid mixture of rosin and sperm or similar oil to which has been admixed finely pulverized charcoal and a lesser amount of pulverized oxide of iron.

5. A soldering flux comprising a fluid formed of a solution of rosin in sperm or similar oil with pulverized charcoal substantially equal in weight to the rosin and with an admixture of pulverized oxide of iron, approximating in weight not to exceed half of the rosin content.

In testimony whereof, I have signed my name to this application, in the presence of two subscribing witnesses, this 8 day of January, 1921.

EUGENE M. HEARNE.

Witnesses:
H. MUCHMORE,
HERMANN F. CUNTZ.